(12) United States Patent
Konchan

(10) Patent No.: US 8,172,599 B2
(45) Date of Patent: May 8, 2012

(54) ELECTRIC VEHICLE CHARGE CORD LOCK

(75) Inventor: Jeffrey L. Konchan, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 54 days.

(21) Appl. No.: 12/901,727

(22) Filed: Oct. 11, 2010

(65) Prior Publication Data

US 2012/0088382 A1    Apr. 12, 2012

(51) Int. Cl.
*H01R 13/62* (2006.01)

(52) U.S. Cl. ........ 439/352; 320/108; 320/109; 320/111; 439/310

(58) Field of Classification Search ............... 320/108, 320/109, 111; 439/352, 34, 310
See application file for complete search history.

(56) References Cited

U.S. PATENT DOCUMENTS

| | | | |
|---|---|---|---|
| 5,711,558 A * | 1/1998 | Woody | 292/335 |
| 7,795,841 B2 * | 9/2010 | Matsumoto | 320/109 |
| 8,025,526 B1 * | 9/2011 | Tormey et al. | 439/528 |
| 8,075,329 B1 * | 12/2011 | Janarthanam et al. | 439/304 |
| 2010/0013433 A1 * | 1/2010 | Baxter et al. | 320/109 |
| 2010/0320964 A1 * | 12/2010 | Lathrop et al. | 320/109 |
| 2010/0320966 A1 * | 12/2010 | Baxter et al. | 320/109 |
| 2011/0246014 A1 * | 10/2011 | Sauper | 701/22 |
| 2011/0247824 A1 * | 10/2011 | Gu | 166/308.1 |
| 2011/0287649 A1 * | 11/2011 | Kurumizawa et al. | 439/304 |

* cited by examiner

*Primary Examiner* — Gary F. Paumen

(57) ABSTRACT

A charge cord lock system for a vehicle having rechargeable batteries. The system includes a charging receptacle; and a charge cord assembly having a charge plug slidably received in the charging receptacle and including a recess defining a retention flange. The system also includes a cord lock including a catch mounted to a plunger, with the plunger mounted to an actuator that moves the plunger toward and away from the charging receptacle, the catch engaged with the retention flange when the plunger is in an extended position and not engaged with the retention flange when the plunger is in a retracted position; and a controller in communication with a door lock mechanism and the actuator to cause the plunger to move to the retracted position when a door unlock signal is received and to cause the plunger to move to the extended position when a door lock signal is received.

16 Claims, 2 Drawing Sheets

ELECTRIC VEHICLE CHARGE CORD LOCK

BACKGROUND OF INVENTION

The present invention relates generally to charging systems for electric and hybrid electric types of vehicles, and more particularly to selectively retaining a charging plug in the vehicle while the vehicle's batteries are being charged.

Some recent automotive vehicles employ on-board battery packs that can be charged while the vehicle is parked. For these vehicles, one end of a plug may be inserted into an electrical outlet in a garage, for example, and the other end is plugged into a receptacle in the vehicle. While plugged in, the vehicle batteries charge, thus providing the driver with maximum operating range on battery when the vehicle is next used.

SUMMARY OF INVENTION

An embodiment contemplates a charge cord lock system for a vehicle having a rechargeable battery. The charge cord lock system may comprise a vehicle structure defining a charging receptacle; and a charge cord assembly having a charge plug slidably received in the charging receptacle, with the charge plug including a retention recess recessed into a side of the charge plug to define a retention flange. The charge cord lock system also may comprise a cord lock including a catch resiliently mounted to a plunger, with the plunger mounted to an actuator that selectively moves the plunger toward and away from the charging receptacle, the catch engageable with the retention flange when the plunger is in an extended position to prevent removal of the charge plug from the charging receptacle and not engageable with the retention flange when the plunger is in a retracted position; and a controller in communication with a vehicle door lock/unlock request mechanism and the actuator to cause the actuator to move the plunger to the retracted position when a door unlock signal is received from the lock/unlock request mechanism and to cause the actuator to move the plunger to the extended position when a door lock signal is received from the lock/unlock request mechanism.

An embodiment contemplates a method of selectively retaining a charge plug of a charge cord assembly in a charging receptacle of vehicle structure for a vehicle having a rechargeable battery, the method comprising the steps of: receiving a vehicle door lock signal; after receiving the vehicle door lock signal, moving a plunger of a cord lock to an extended position, causing a catch mounted on the plunger to move into engagement with a retention flange on the charge plug when the charge plug is installed in the charging receptacle; receiving a vehicle door unlock signal; and after receiving the vehicle door unlock signal, moving the plunger of the cord lock to a retracted position, causing the catch to remain out of engagement with the retention flange on the charge plug when the charge plug is installed in the charging receptacle.

An advantage of an embodiment is that the charge cord assembly can be easily locked into the charging receptacle on the vehicle so that it is not accidentally pulled out while charging. In addition, the charge cord assembly can be easily unlocked and removed when the vehicle is going to be driven. The locking and unlocking of the charge cord is accomplished in an intuitive manner, making it easy for a new vehicle owner to operate the cord lock. Moreover, the charge plug can be inserted in the receptacle whether the charge cord assembly is locked or unlocked.

Another advantage of an embodiment is that only one additional electrical actuator assembly needs to be packaged in the vehicle, without additional vehicle switches or controls required, thus minimizing cost and complexity of the assembly.

DETAILED DESCRIPTION

Figure 1:
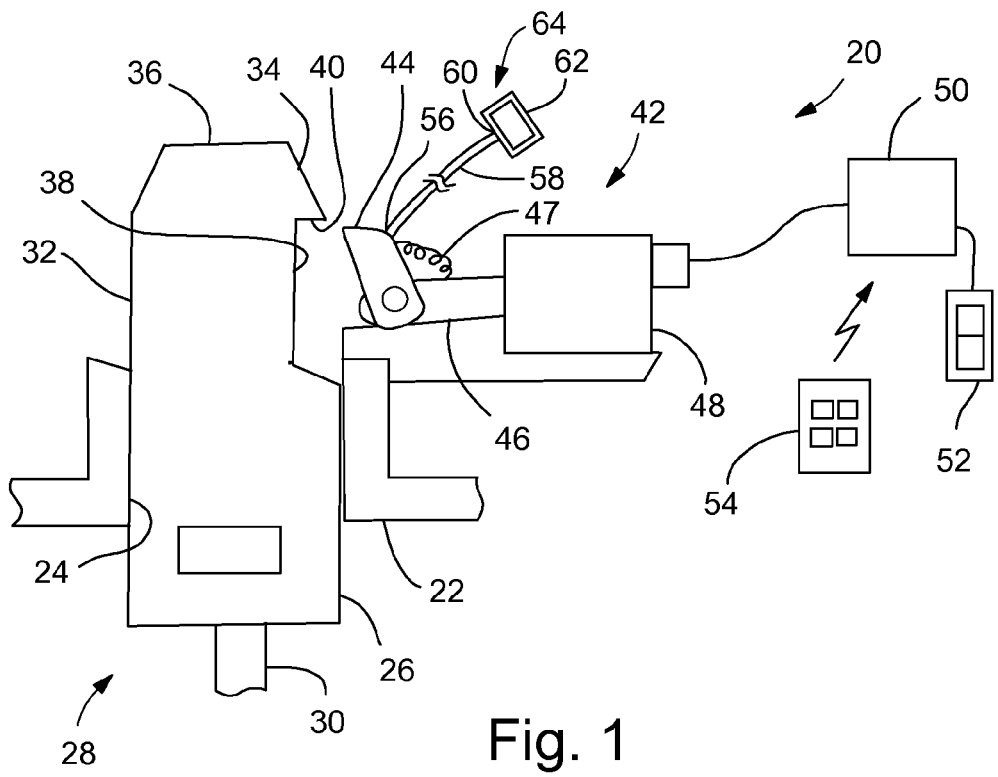
FIG. 1 is a schematic drawing of a charge cord assembly and cord lock, with the cord lock in an unlocked position.
Figure 2:
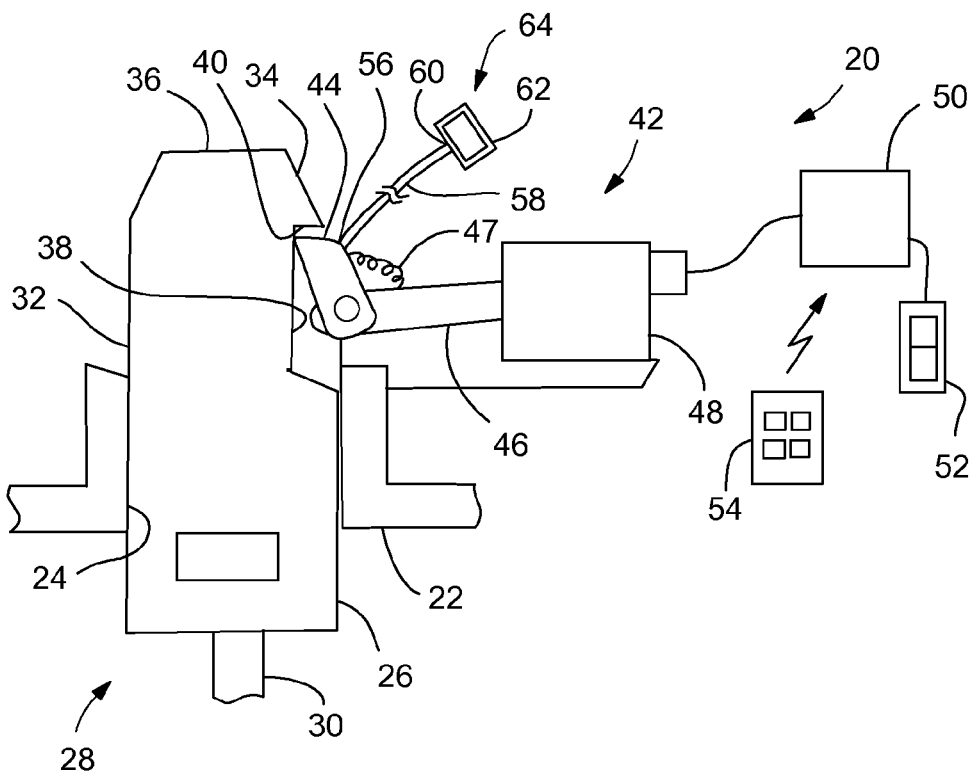
FIG. 2 is a schematic drawing similar to FIG. 1, but with the cord lock in a locked position.

Referring to FIGS. 1 and 2, a vehicle with plug-in electrical charging, indicated generally at 20, is shown. The vehicle 20 includes vehicle structure 22 that forms a vehicle charging receptacle (charging socket) 24 that is sized and shaped to receive a charge plug 26 of a charge cord assembly 28. The charge plug 26 connects to electronic hardware (not shown) on the vehicle for charging vehicle batteries (not shown). The charge cord assembly 28 also includes a charge cord 30, the other end of which connects to a source of electricity (not shown).

The charge plug 26 includes a main body 32 that telescopically slides into the receptacle 24 and has a sloped insertion surface 34 adjacent to a terminal end 36 of the plug 26. A retention recess 38 is recessed into a side of the plug 26 and forms a retention flange 40 adjacent to the sloped surface 34. The sloped surface 34, recess 38 and retention flange 40 all include at least a portion that faces a cord lock 42.

The cord lock 42 is mounted to the vehicle structure 22 and includes a catch 44 that is pivotally mounted on a plunger 46. A catch spring 47 is secured between the catch 44 and plunger 46 to bias the catch 44 into a position where it extends toward the retention recess 38. The spring 47 may be a coil spring or may be something else, such as an elastically flexible material that can be relatively easily flexed and when released will return the catch 44 to its original position. The plunger 46 is mounted to and telescopically slidable by a motor and gear assembly (actuator) 48. The motor and gear assembly 48 may be, for example, much like a conventional power door lock actuator as is used on common automotive vehicles. When actuated, the motor and gear assembly 48 can selectively push the plunger 46 outward toward the retention recess 38 or retract the plunger 46 inward away from the retention recess 38.

The motor and gear assembly 48 may be controlled by a controller 50, such as, for example, a body controller. Although, it may be a separate controller or another type of vehicle controller, if so desired. This controller 50 may also be in communication with a door lock/unlock switch 52 for a vehicle door (not shown) or a wirelessly transmitting key fob 54 or both. The controller 50 door lock switch 52 and key fob 54 are part of a power door lock system of the vehicle.

In addition, a manual release assembly 64 may be included as a backup cable release, if so desired. The manual release assembly 64 may include a Bowden cable 58. A first end 56 of the Bowden cable 58 may be attached to the catch 44, with a second end 60 attached to a manual release handle 62 that is accessible to a vehicle operator. The release handle 62 can be located anywhere in the vehicle where it is generally out of the way of vehicle occupants but still accessible should one need to manually release the cord lock 42 from the charge plug 26.

The operation of the charge cord assembly 28 and cord lock 42 will now be discussed. When the controller 50 receives a signal from the key fob 54 or the door lock switch 52 to unlock the vehicle doors (not shown), not only does the controller 50 cause the vehicle doors to unlock, but it also activates the motor and gear assembly 48 to move the plunger 46 to the retracted position (shown in FIG. 1). In this position, the charge plug 26 can be easily slid into and out of the charging receptacle 24 without engagement with the catch 44 of the cord lock 42.

When the controller receives a signal from the key fob 54 or the door lock switch 52 to lock the vehicle doors, not only does the controller 50 cause the vehicle doors to lock, but it also activates the motor and gear assembly 48 to move the plunger 46 to the extended position (shown in FIG. 2). In this position, the charge plug 26 can still be easily slid into the receptacle 24 because, as one holds the main body 32 and pushes the charge plug 26 into the receptacle 24, the sloped insertion surface 34 will cause the catch 44 to pivot outward against the bias of the catch spring 47 until the catch 44 aligns with the retention recess 38. At this point, the catch spring 47 will pivot the catch 44 into the retention recess 38. Once in this position, the charge plug 26 cannot be removed while the vehicle doors are still locked. If one tries to pull the charge plug 26 out, the catch 44 will engage the retention flange 40, preventing removal.

Thus, the cord lock 42 is able to selectively lock the charge plug 26 into the charging receptacle 24 without the need for additional controllers, vehicle switches or key fob switches. The charge plug 26 can always be slid into the receptacle 24, but the charge plug can be prevented from being inadvertently removed when one wishes to charge the vehicle batteries.

Additionally, should the motor and gear assembly 48 or other component malfunction or the vehicle lose power while the charge plug 26 is plugged in and the doors locked, removal of the charge plug 26 is still possible. One only needs to pull on the manual release handle 62, which will cause the catch 44 to pivot away from the retention recess 38 against the bias of the catch spring 47. The charge plug 26 can then be slid out of the receptacle 24 without the catch 44 engaging the retention flange 40.

Figure 3:
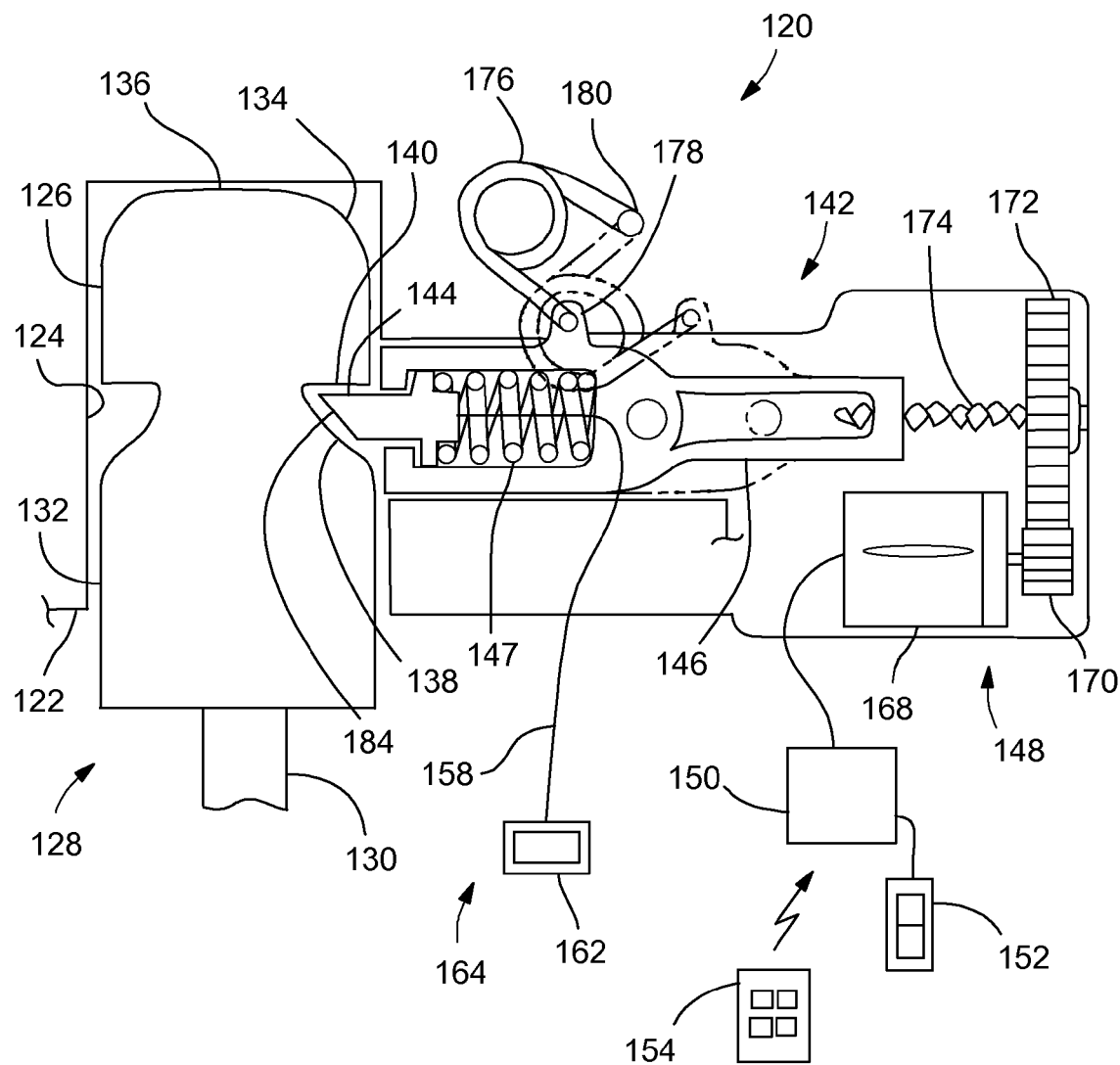
FIG. 3 is a schematic drawing of a charge cord assembly and a cord lock according to a second embodiment.

FIG. 3 illustrates a second embodiment. This embodiment is similar to the first and so similar elements will have similar numbers but in the 100-series. The vehicle 120 includes vehicle structure 122 that forms a vehicle charging receptacle 124 that is sized and shaped to receive a charge plug 126 of a charge cord assembly 128. The charge cord assembly 128 includes a charge cord 130, the other end of which connects to a source of electricity (not shown).

The charge plug 126 includes a main body 132 that telescopically slides into the receptacle 124 and has a sloped insertion surface 134 adjacent to a terminal end 136 of the plug 126. A retention recess 138 is recessed into a side of the plug 126 and forms a retention flange 140 below the sloped surface 134. The sloped surface 134, recess 138 and retention flange 140 all include at least a portion that faces a cord lock 142.

The cord lock 142 is mounted to the vehicle structure 122 and includes a catch 144 that is telescopically mounted on a plunger 146. A catch spring 147 is located between the catch 144 and plunger 146 to bias the catch 144 into a position where it extends toward the retention recess 138. The spring 147 may be a coil spring or may be something else, such as an elastically flexible material that can be relatively easily compressed and when released will return the catch 144 to its original position. The plunger 146 is mounted to and telescopically slidable by a motor and gear assembly 148. The motor and gear assembly 148 may include a motor 168 that drives a driving spur gear 170, which, in turn, drives a driven spur gear 172. The driven spur gear 172 rotationally drives a jack screw 174, which engages the plunger 146 to cause the plunger to extend and retract as the jack screw 174 is rotated in one direction or the other. When actuated, the motor and gear assembly 148 can selectively push the plunger 146 outward toward the retention recess 138 or retract the plunger 146 inward away from the retention recess 138.

An over center spring 176 may have one end mounted to a flange 178 that extends from the plunger 146 and another end 180 that is mounted in a fixed position relative to vehicle structure. The over center spring 176 and a portion of the plunger 146 are shown in phantom in the retracted position. The solid lines show the components of the second embodiment in the extended position. The over center spring 176 helps to bias the plunger 146 into the fully retracted or fully extended positions.

The motor and gear assembly 148 may be controlled by a controller 150. This controller 150 may also be in communication with a door lock/unlock switch 152 for a vehicle door (not shown) or a wirelessly transmitting key fob 154 or both. The controller 150, door lock switch 152 and key fob 154 are part of a power door lock system of the vehicle.

In addition, a manual release assembly 164 may be included as a backup cable release, if so desired. The manual release assembly 164 may include a Bowden cable 158. A first end of the Bowden cable 158 may be attached to the catch 144, with a second end attached to a manual release handle 162 that is accessible to a vehicle operator.

The operation of the charge cord assembly 128 and cord lock 142 are similar to the first embodiment. Again, the vehicle door lock and unlock function controls the when the motor and gear assembly 148 extends and retracts the plunger 146. The difference being that the spur gears 170, 172, jack screw 174 and over center spring 176 are now employed for the extension and retraction of the plunger 146.

And again, the charge plug 126 can be inserted into the receptacle 124, even when the plunger 146 is extended. In this case, as the charge plug 126 is inserted, the sloped insertion surface 134 pushes on the catch angled surface 184, causing the catch 144 to telescopically retract against the bias of the catch spring 147 until the catch 144 reaches the retention recess 138, at which point the spring 147 will push the catch 144 into the retention recess 138. The charge plug 126 cannot be pulled out until the vehicle doors are unlocked, at which time the plunger 146 is retracted.

A backup manual release may also be employed with this embodiment. One only needs to pull on the manual release handle 162, which will cause the catch 144 to slide away from the retention recess 138 against the bias of the catch spring 147. The charge plug 126 can then be slid out of the receptacle 124 without the catch 144 engaging the retention flange 140.

While the spur gears and jack screw are shown in the second embodiment, such an arrangement may also be employed in the first embodiment to extend and retract the plunger. Also, the shape of the insertion surface on the second embodiment may be employed with the first embodiment and vice versa. Additionally, for either embodiment, the motor and gear assembly that extends and retracts the plunger could be a motor engaging a rack and pinion type of gear arrangement. And, additionally, the over center spring shown in the second embodiment may be employed with the first embodiment as well, if so desired.

While certain embodiments of the present invention have been described in detail, those familiar with the art to which this invention relates will recognize various alternative designs and embodiments for practicing the invention as defined by the following claims.

What is claimed is:

1. A charge cord lock system for a vehicle having a rechargeable battery, the charge cord lock system comprising:
   a vehicle structure defining a charging receptacle;
   a charge cord assembly having a charge plug configured to be slidably received in the charging receptacle, the charge plug including a retention recess recessed into a side of the charge plug, the retention recess defining a retention flange;
   a cord lock including a catch mounted to a plunger, the plunger mounted to an actuator that is configured to selectively move the plunger toward and away from the charging receptacle, the catch configured to be engageable with the retention flange when the plunger is in an extended position to prevent removal of the charge plug from the charging receptacle and not engageable with the retention flange when the plunger is in a retracted position; and
   a controller in communication with a vehicle door lock/unlock request mechanism and the actuator, the controller configured to cause the actuator to move the plunger to the retracted position when a door unlock signal is received from the lock/unlock request mechanism and to cause the actuator to move the plunger to the extended position when a door lock signal is received from the lock/unlock request mechanism.

2. The charge cord lock system of claim 1 wherein the catch is resiliently mounted to the plunger, a catch spring is mounted between the catch and the plunger to bias the catch into a predetermined position relative to the plunger, the charge plug includes a sloped insertion surface adjacent to a terminal end of the charge plug, and the catch is configured such that, when the plunger is in the extended position and the charge plug is slid into the charging receptacle, the sloped insertion surface will move the catch against the bias of the catch spring to allow insertion of the charge plug and, upon full insertion, the catch spring will move the catch into the retention recess.

3. The charge cord lock system of claim 2 wherein the catch is pivotally mounted on the plunger.

4. The charge cord lock system of claim 2 wherein the catch is telescopically moveable relative to the plunger.

5. The charge cord lock system of claim 1 wherein the actuator includes a motor connected to a gear set, the gear set operatively engaging the plunger to move the plunger between the extended position and the retracted position.

6. The charge cord lock system of claim 5 wherein the actuator includes a jack screw connected to the gear set and connected to the plunger.

7. The charge cord lock system of claim 1 wherein the cord lock includes an over center spring connected at a first end to the plunger and at a second end to the vehicle structure, the over center spring configured to bias the plunger toward the extended position when the plunger is near the extended position and to bias the plunger toward the retracted position when the plunger is near the retracted position.

8. The charge cord lock system of claim 1 wherein the vehicle door lock/unlock request mechanism is a key fob.

9. The charge cord lock system of claim 1 wherein the vehicle door lock/unlock request mechanism is a door lock/unlock switch mounted inside of the vehicle.

10. The charge cord lock system of claim 1 wherein the cord lock includes a manual release assembly configured to selectively disengage the catch from the retention flange.

11. The charge cord lock system of claim 10 wherein the manual release assembly includes a cable connected to the catch and connected to a manual release handle, the cable configured to pull the catch away from the retention recess.

12. A method of selectively retaining a charge plug of a charge cord assembly in a charging receptacle of vehicle structure for a vehicle having a rechargeable battery, the method comprising the steps of:
   (a) receiving a vehicle door lock signal;
   (b) after receiving the vehicle door lock signal in step (a), moving a plunger of a cord lock to an extended position, causing a catch mounted on the plunger to move into engagement with a retention flange on the charge plug when the charge plug is installed in the charging receptacle, thereby preventing the charge plug from being removed from the receptacle;
   (c) receiving a vehicle door unlock signal; and
   (d) after receiving the vehicle door unlock signal in step (c), moving the plunger of the cord lock to a retracted position, causing the catch to remain out of engagement with the retention flange on the charge plug when the charge plug is installed in the charging receptacle, thereby allowing the charge plug to be removed from the receptacle.

13. The method of claim 12 wherein step (a) is further defined by a controller receiving a vehicle door lock request from a key fob.

14. The method of claim 12 wherein step (a) is further defined by a controller receiving a vehicle door lock request from a door lock/unlock switch mounted inside of the vehicle.

15. The method of claim 12 further comprising:
   (e) when the plunger is in the extended position, pulling on a manual release handle connected to the catch by a cable to cause the catch to move out of engagement with the retention flange.

16. The method of claim 12 further comprising:
   (e) resiliently mounting the catch to the plunger and a catch spring between the catch and the plunger to bias the catch into a predetermined position relative to the plunger;
   (f) moving the plunger to the extended position; and
   (g) sliding the charge plug into the charging receptacle, wherein the charge plug moves the catch against the bias of the catch spring to allow insertion of the charge plug and, upon full insertion, the catch spring moves the catch into the retention recess.

* * * * *